United States Patent Office 3,194,349
Patented July 13, 1965

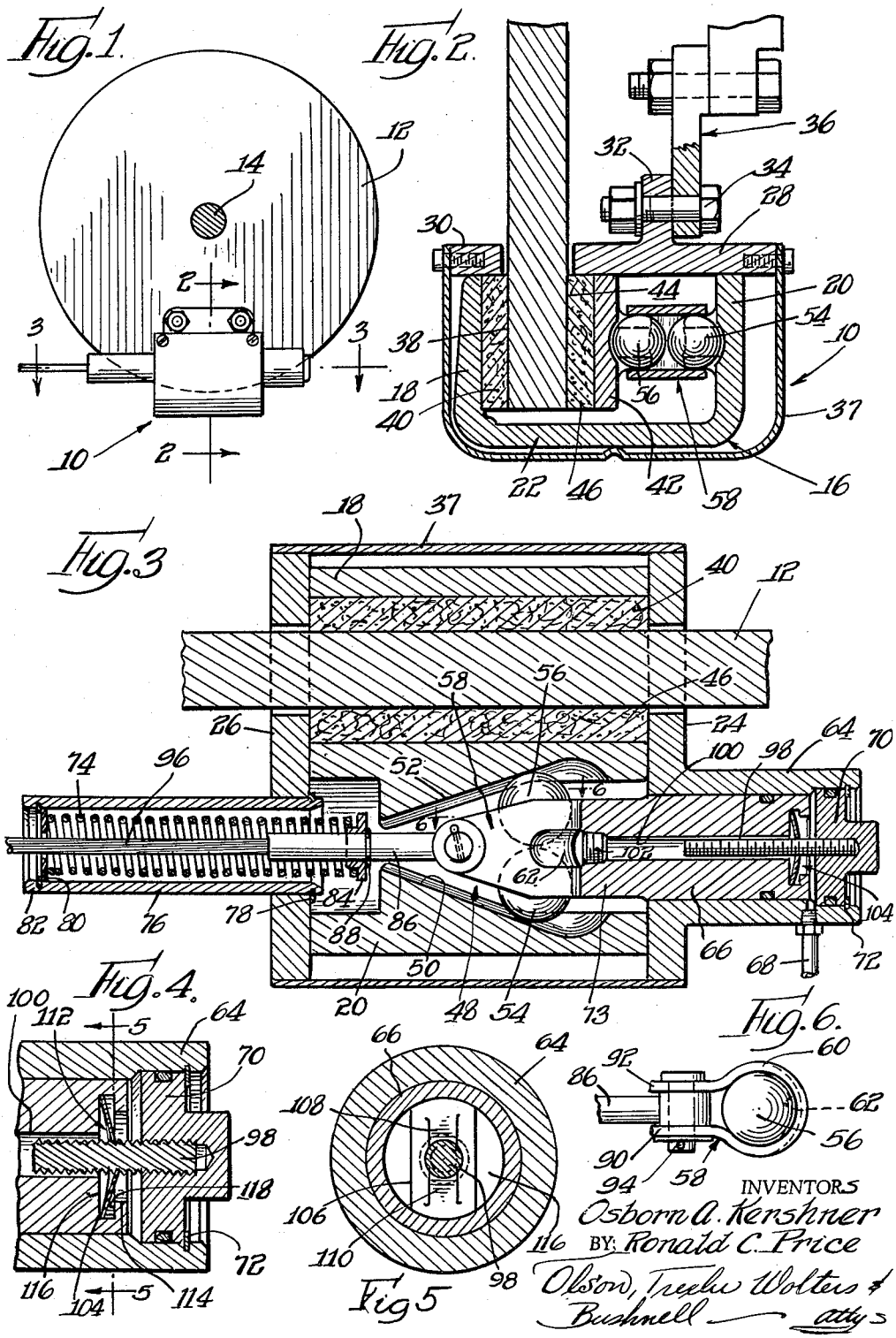

3,194,349
WEDGE OPERATED SPOT BRAKE
Osborn A. Kershner and Ronald C. Price, St. Joseph, Mich., assignors, by mesne assignments, to Lambert Brake Corporation, St. Joseph, Mich., a corporation of Michigan
Filed Mar. 6, 1963, Ser. No. 263,235
2 Claims. (Cl. 188—73)

The present invention relates to a novel friction device, and more specifically to a novel brake structure.

An important object of the present invention is to provide a novel brake unit adapted to embrace and engage areas of a rotary member to be controlled, which unit may be selectively actuated mechanically or with fluid under pressure.

A more specific object of the present invention is to provide a novel caliper type brake unit which may be actuated with hydraulic or mechanical means.

A further specific object of the present invention is to provide a novel brake unit of the above-described type which automatically adjusts for compensating for wear during operation of the unit.

A further object of the present invention is to provide a novel brake unit of the above-described type which is of relatively simple, economical and efficient construction.

Other objects and advantages of the present invention will become apparent from the following description and the accompanying drawings wherein:

FIG. 1 is a simplified sectional view showing a brake unit incorporating the features of the present invention associated with a rotatable member to be controlled;

FIG. 2 is an enlarged fragmentary sectional view taken generally along line 2—2 FIG. 1;

FIG. 3 is a further enlarged fragmentary sectional view taken along lines 3—3 in FIG. 1;

FIG. 4 is a still further enlarged fragmentary sectional view showing a portion of the structure of FIG. 3 in greater detail;

FIG. 5 is a sectional view taken along lines 5—5 in FIG 4; and

FIG. 6 is a fragmentary sectional view taken along lines 6—6 in FIG. 3.

Referring now more specifically to the drawings wherein like parts are designated by the same numerals throughout the figures, a brake unit 10 incorporating features of the present invention is shown in assembled relationship with a rotary member or disc 12. The disc 12 is fixed on a rotatable shaft 14 which may, for example, be an axle of a small vehicle, truck or the like. The rotary member 12 and the shaft 14 might also be parts of various pieces of machinery as well as parts of a vehicle. In other words the brake unit may be adapted for stopping or controlling any desired rotatable member.

The unit 10 comprises a main frame member 16 having opposed upstanding end portions 18 and 20 joined by a bight portion 22 and providing a generally U-shape. As shown best in FIG. 3, opposite edges of the U-shaped frame member 16 are covered and closed by frame members 24 and 26 forming end walls of housing 37. Cover members 28 and 30 are detachably secured by screws or other suitable means over the upper edges of the frame members 24 and 26 as shown best in FIG. 2. The cover or frame member 28 is provided with an upstanding flange 32 which is adapted to be secured by bolts 34 or other suitable fastening means to a fixed member 36 which may be a bracket or fixed frame member of the vehicle or other piece of machinery with which the brake unit is assembled. The housing 37 is connected by screws or the like to the members 24 and 26 for slidably retaining the U-shaped member 16 for movement transversely of the disc 12.

The brake unit is disposed so that the generally U-shaped frame member 16 embraces a circumferentially limited portion of the rotatable member or disc 12. As shown in FIGS. 2 and 3, the upstanding portion 18 of the U-shaped member is disposed closely adjacent to one side or friction surface 38 of the rotatable member, and a pad 40 of suitable friction material is bonded or otherwise secured to the frame portion 18 for engagement with the friction surface 38.

The brake unit is provided with a shoe 42 slidably shiftably disposed between the upstanding portion 20 of the frame member 16 and a side or friction surface 44 of the rotatable member opposite from the friction surface 38. A pad 46 of suitable friction material, is bonded or otherwise secured to the shoe 42 for engagement with the friction surface 44 when the brake is actuated in the manner described below.

In order to force the pads of friction material against the opposite side surfaces of the disc 12 and thereby accomplishing braking action, the brake unit is provided with actuating or wedge means 48 between the upstanding frame portion 20 and the shoe 42. The wedge means comprises converging ball seats or cam surfaces 50 and 52 respectively integrally formed on the upstanding frame portion 20 and the shoe 42. Wedging or ball elements 54 and 56 are shiftably disposed between the cam surfaces and respectively engage the cam surfaces 50 and 52. The ball elements are retained by a cage member 58 which is adapted to be actuated in the manner hereinafter described.

The cage member 58 may be economically stamped and formed from sheet metal. As shown best in FIG. 6, the cage member 58 is formed with generally tubular or loop portion 60 for retaining the ball elements with their centers substantially on a common axis extending perpendicular to the direction of movement of the cage 58. The loop or tubular portion 60 of the cage is provided with a semi-annular inwardly indented rib 62 which is adapted to project partially between the balls 54 and 56 for maintaining the balls substantially centered with respect to the cage member while permitting the balls to have free rolling contact with each other as well as with the cam surfaces 50 and 52.

In order to actuate the wedging means or balls longitudinally of the cam surfaces and thus energize the brake unit, a fluid pressure or hydraulic cylinder 64 is provided. In the embodiment shown, this cylinder is formed integrally with the frame member 24. A piston 66 is slidably disposed within the cylinder 64 and is adapted to be actuated toward the left as viewed in FIG. 3 by hydraulic fluid under pressure which may be delivered behind the piston through a suitable supply conduit 68. The outer end of the cylinder is, of course, closed and sealed by a suitable plug 70 which, in the embodiment shown, is fixed with respect to the cylinder by a snap ring 72.

When the hydraulic fluid is introduced into the cylinder 64, the piston 66 will be actuated toward the left as viewed in FIG. 3. The piston has an extending portion 73 in engagement with cage member 58 so that the cage member and the wedging balls move with the piston along the convering portions of the cam surfaces 50 and 52. It will be appreciated that this action causes the shoe 42 to be forced away from the frame portion 20 for engagement with the rotatable member 12 and at the same time the frame member 20 is forced away from the rotatable member which action, in turn, causes the frame portion 18 and the friction pad thereon to be drawn into engagement with the friction surface 38 of the rotatable member.

In order to return the wedging means or ball elements toward a retracted or deenergized position when the pressure on the hydraulic fluid in the cylinder 64 is relieved, a spring 74 is provided. The spring is disposed within a tubular housing 76 which has one end fixed with respect to the frame member 26 by a snap ring 78 or other suitable means. An outer end of the spring 74 abuts against an annular washer 80 which is fixed within the outer end of the tubular member 76 by a snap ring 82 or other suitable means. An opposite end of the spring 74 abuts against a washer 84 which is fixed on a tubular fitting 86 by means of a snap ring 88 or any other suitable device. The fitting 86, in turn, has one end disposed between and pivotally connected to end portions 90 and 92 of the cage member 58. A pin 94 is provided for pivotally connecting the cage member and the fitting 86. It will be appreciated that with this structure, the compression spring 74 urges the washer 84 and thus the fitting 86 and the cage member 58 toward the right as viewed in FIG. 3 for returning the wedge means to its retracted position when the fluid pressure is relieved.

In accordance with one feature of the present invention, the brake unit is provided with mechanical means as well as the previously described fluid pressure or hydraulic means for shifting the wedge balls toward the left as viewed in FIG. 3 and thereby energizing the brake. More specifically, a cable, link, or the like 96 is secured to the fitting 86 and extends through the washer 80 and out from the tubular member 76. The cable 96 is connected with a suitable foot pedal, hand lever, or other mechanically operated linkage or lever system, not shown, so that an operator may energize the brake unit by manually operating such lever or linkage system so as to pull the cable 96 toward the left as viewed in FIG. 3. It is apparent that such a manually operable lever or linkage system could be used in emergency situations in the event of failure of the hydraulic pressure or even simultaneously with and supplementary to the hydraulic pressure, or for any other desired purpose. For example, the mechanical actuating means could be used when it is desired to park the vehicle with which the brake is associated. In such a situation, the mechanical lever or linkage system would of course include means for releasably locking the foot pedal or hand lever in the actuated position for maintaining the tension on the cable 96.

It will be appreciated that during a braking operation the surfaces of the pads 40 and 46 of friction material will be slightly worn away so that the pads are reduced in thickness. As a result, it becomes necessary to advance the wedging means or ball elements a greater distance along the cam surfaces from the initial or fully retracted position in order to force the friction pads against the rotatable disc. In accordance with a feature of the present invention, the brake unit is provided with novel means for automatically adjusting the location of the retracted position of the wedging means for compensating for the wear on the friction surfaces and maintaining a substantially constant running clearance between the friction pads and the surfaces of the rotatable member 12 whereby to promote uniform operation of the brake unit throughout the life of the friction pad.

The adjusting means comprises an elongated rod 98 having a series of stop surfaces or teeth spaced thereon and one end fixed in a threaded aperture in the plug 70. In this embodiment the rod 98 is in the form of a screw rod and the teeth are provided by thread segments. The screw rod 98 extends axially into a bore 100 through the piston 66, which bore has an end thereof closed and sealed by a plug 102. The bore 100 has a diameter substantially greater than the diameter of the screw rod 98 so that the piston is adapted to move freely with respect to the fixed screw rod.

The rearward movement of the piston 66 and thus the wedging means is limited by an adjustable stop or abutment member 104 on the screw rod 98. The abutment member 104 is a washer like element having a body 106 formed from resilient sheet material, preferably spring steel, and having a central aperture through which the screw rod extends. The body 106 is provided with spring fingers 108 and 110 which are inclined with respect to each other toward the fixed end of the screw rod and which project for inter-locking engagement with the threads of the screw rod. Preferably the body 106 of the abutment member is arched as shown best in FIG. 4 for providing a relatively rigid stop or abutment.

The body 106 of the abutment member is disposed within an annular recess 112 formed in the piston 66 adjacent to but axially offset from the outer end of the piston. The outer end of the piston terminates in an inturned flange 114 partially overlying the body member 106 but having an internal diameter sufficiently large to enable the body member to be flexed or arched and snapped through the opening defined by the flange and into the recess 112.

The annular recess 112 is partially defined by an axially outwardly or rearwardly facing surface 116 which is engageable with one side of the body member 106 and an axially inwardly facing surface 118 on the flange 114 which is engageable with the opposite side of the body member 106. However, it is to be noted that the surfaces 116 and 118 are axially spaced from each other a distance greater than the thickness or axial extent of the body member 106 measured at a location in axial alignment with the inner edge of the flange 114. Thus the surfaces 116 and 118 do not engage the body member 106 at the same time and a predetermined clearance is provided so that the piston 106 may be moved a predetermined distance before the surface 118 will engage the body member 106.

The clearance between the surface 118 and the body member 106 when the piston 66 is fully retracted is such that when the brake is initially energized, the friction pads 40 and 46 will be fully engaged against opposite sides of the rotatable member 12 before there is sufficient engagement of the surface 118 with the body member 106 to cause adjustment of the body member. However, as the friction pads 40 and 46 wear and become reduced in thickness, the piston 66 must necessarily be moved a greater distance for energizing the brake structure and more positive engagement of the surface 118 with the body member 106 will be accomplished. Eventually, the movement of the piston 66 will be such that the surface 118 will press against the body member 106 to such an extent that the finger elements 108 and 110 will be flexed and snapped past one or more of the thread segments on the screw rod 98. In other words, the abutment member 104 will be adjusted and advanced along the screw rod so that when the piston is subsequently returned toward its retracted position, the abutment or stop member 104 will have been adjusted to limit such return movement.

While the preferred embodiment of the present invention has been shown and described herein, it is obvious that many structural details may be changed without departing from the spirit and scope of the appended claims:

The invention is claimed as follows:

1. A brake unit for controlling a rotatably mounted disc comprising the frame structure adapted to be fixedly mounted adjacent a predetermined peripheral portion of said disc and including a housing having top, bottom and end walls with the peripheral portion of the disc extending into the housing, a generally U-shaped member disposed within said housing and having opposed end portions at opposite sides of the disc and a bight portion bodily shiftably supported by the bottom wall of the housing and with said end portions confined by the end walls of the housing for rectilinear movement of the U-shaped member therein, a shoe member disposed between said first end portion and said disc, said shoe member and said first end portion having opposed elongated converging cam surfaces, wedge means disposed between and engaging said cam surfaces and shiftable in a straight line and generally parallel to said disc for relatively spreading said first end portion and said shoe member and thereby clamping said disc between said shoe member and said second end portion for energizing the brake unit, a fluid pressure cylinder fixed to said frame structure adjacent one end of said wedge means and aligned with said wedge means, a piston operable in said cylinder, said piston having an end abutting said wedge means for pushing the wedge means from a retracted position toward an extended position for energizing the brake unit, an elongated mechanically operable element connected with said wedge means at the end thereof opposite from the end aligned with said piston and selectively operable for pulling said wedge means from said retracted position toward said extended position, spring means surrounding said element and operatively connected between said element and said frame structure for yieldably biasing said wedge means toward the retracted position, and one-way shiftable stop means responsive to movement of said piston for limiting return movement of the wedge means toward the retracted position in accordance with wear of the brake unit.

2. A brake unit, as defined in claim 1, wherein said stop means comprises a rod having stop surfaces spaced therealong and fixed within and extending axially of said cylinder, said piston having an elongated bore therein freely receiving said rod, a stop member shiftable in one direction along said rod and having flexible portions adapted to be snapped over and to engage said stop surfaces, and abutment means on said piston for advancing the stop element along said rod only after said piston has moved relative to said cylinder in excess of its predetermined amount.

References Cited by the Examiner
UNITED STATES PATENTS

| 2,736,396 | 2/56 | Rasmussen et al. | 188—196 |
| 2,741,338 | 4/56 | Taylor | 188—196 |
| 2,820,530 | 1/58 | Chouings et al. | 188—73 |

FOREIGN PATENTS

| 1,231,109 | 4/60 | France. |
| 1,237,699 | 6/60 | France. |
| 761,479 | 11/56 | Great Britain. |

EUGENE G. BOTZ, *Primary Examiner.*